UNITED STATES PATENT OFFICE.

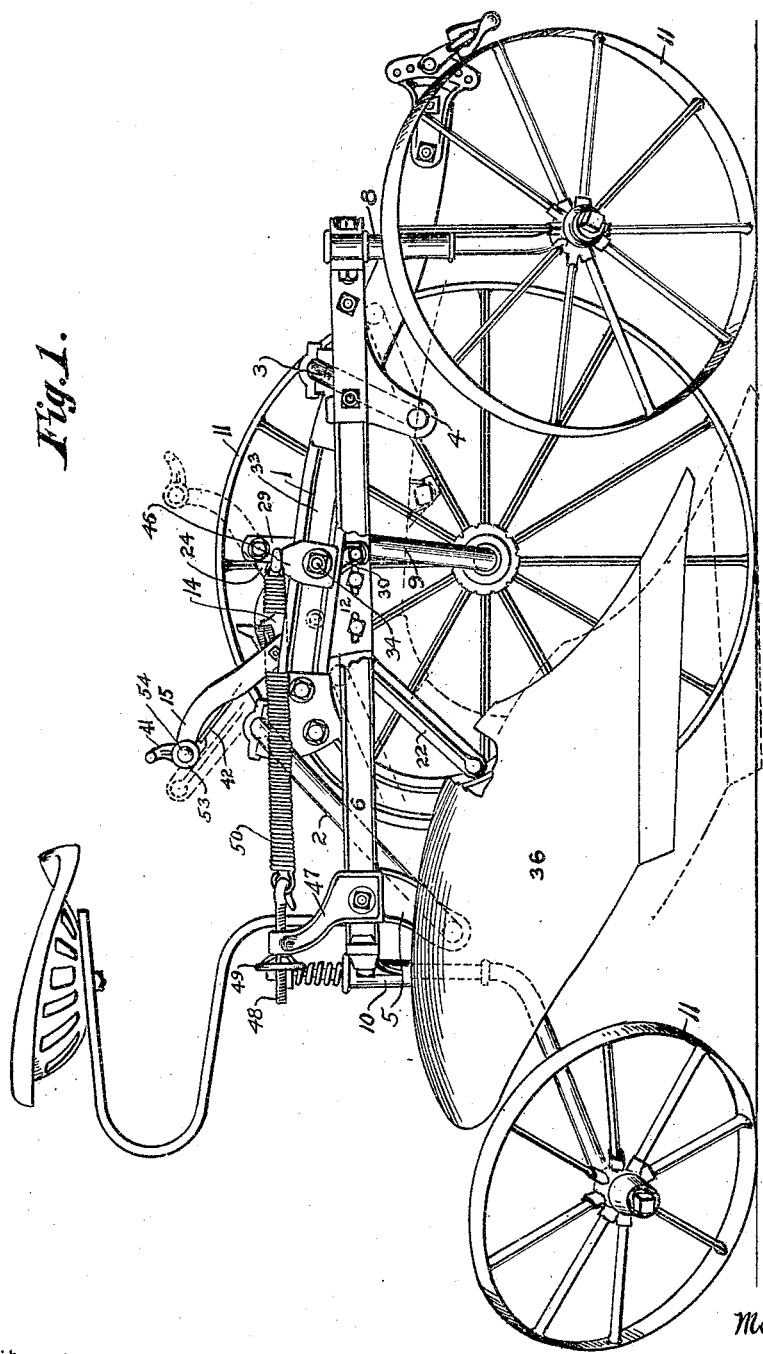

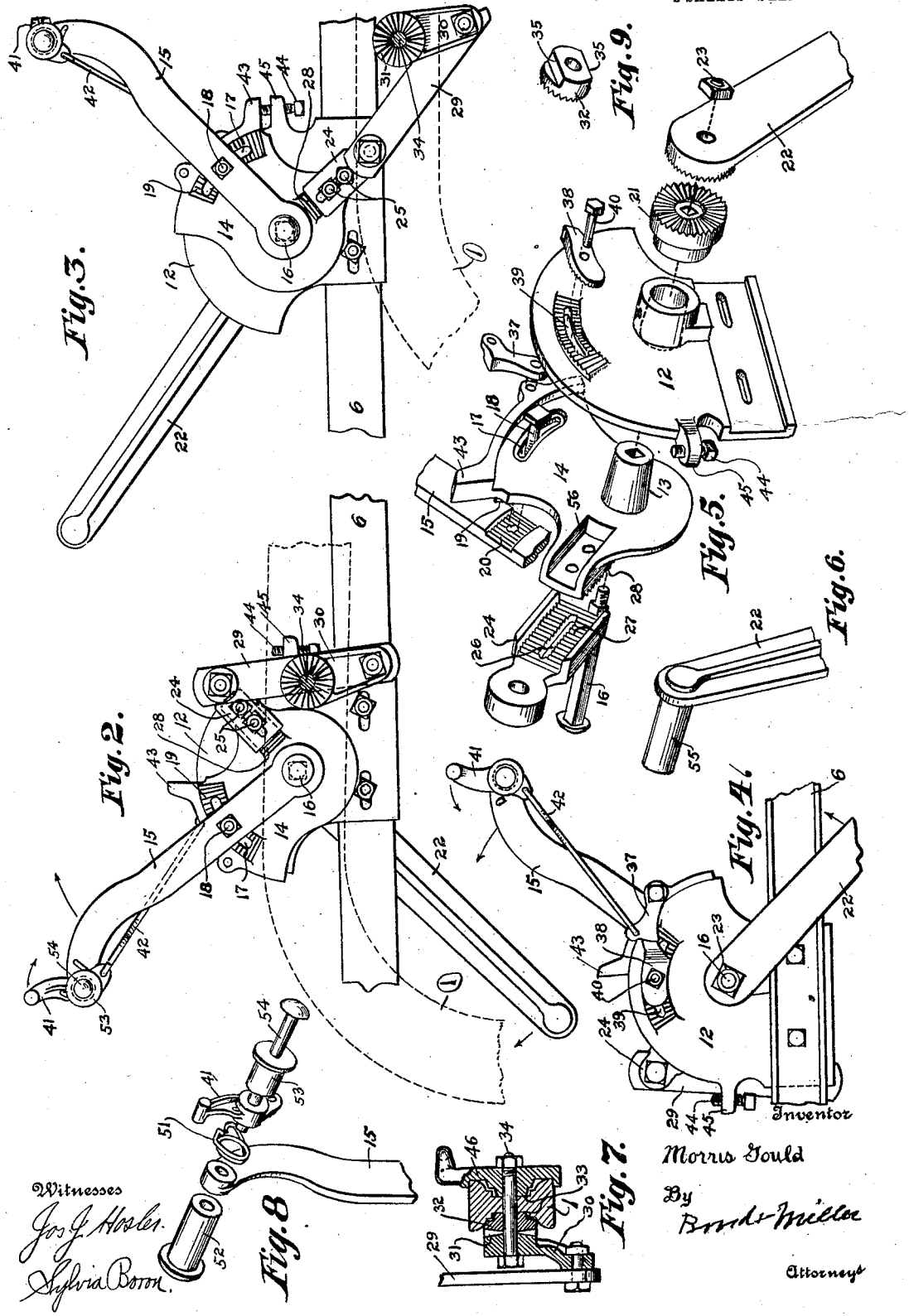

MORRIS GOULD, OF CANTON, OHIO, ASSIGNOR TO THE BUCHER & GIBBS PLOW COMPANY, OF CANTON, OHIO, A CORPORATION OF OHIO.

FOOT-LIFT FOR WHEELED PLOWS.

933,706.  Specification of Letters Patent.  Patented Sept. 7, 1909.

Application filed February 20, 1909. Serial No. 479,296.

*To all whom it may concern:*

Be it known that I, MORRIS GOULD, a citizen of the United States, residing at Canton, in the county of Stark and State of Ohio, have invented certain new and useful Improvements in Foot-Lifts for Wheeled Plows; and I do hereby declare that the following is a full, clear, and exact description of the same, reference being had to the accompanying drawings, making a part of this specification, and to the numerals of reference marked thereon, in which—

Figure 1 is a side elevation showing parts broken away and illustrating the mold board in an elevated position. Fig. 2 is a view showing a portion of the frame illustrating the fixed disk in relative position with reference to the frame and the primary and secondary levers properly connected and showing them in the position illustrated in Fig. 1 and the movable disk located in front of the fixed disk. Fig. 3 is a similar view showing the parts in the position assumed when the mold board is lowered. Fig. 4 is a view showing the portion of the parts illustrated in Figs. 2 and 3 looking at the opposite side from the side shown in Figs. 2 and 3. Fig. 5 is a view showing the movable disk, the fixed disk and the different parts connected to said disks detached from each other and in position to be assembled and brought into proper axial alinement. Fig. 6 is a view showing the outer or free end of the secondary lever. Fig. 7 is a transverse section of the plow beam taken at a point where the operating links are connected to the plow beam, also showing a portion of one of the links. Fig. 8 is a view showing the free end of the primary lever showing the different parts carried by the lever in proper relationship except the detent actuating rod. Fig. 9 is a detached view of the arm holding nut.

The present invention has relation to foot lift for wheeled plows, and it consists in the novel arrangement hereinafter described and particularly pointed out in the claims.

Similar numerals of reference indicate corresponding parts in all the figures of the drawings.

In the accompanying drawing, 1 represents the plow beam, which is of the usual construction such as used in wheeled plows and within itself forms no specific part of the present invention. The plow beam 1 is movably supported upon the bails 2 and 3, which bails are pivotally attached at their lower ends to the brackets 4 and 5, which brackets are attached to the side members 6 of the frame, which side members are supported by the various uprights 8, 9 and 10, which uprights are provided with the axles for the various traveling wheels 11. The construction of the frame is of the usual form and needs no specific description here, owing to the fact that the present invention does not have specific reference to the wheeled plow as a wheeled plow, but more specific reference to the mechanism designed to elevate and lower the plow beam and the different parts such as the mold board and land side. To one of the side members 6 is securely attached the plate 12, which plate is substantially of the form shown in Fig. 5 and as shown said plate is provided with the lateral bearing, within which bearing is loosely mounted the short spindle 13, which spindle is preferably formed integral with the oscillating plate 14, to which oscillating plate is attached the primary lever 15, which primary lever is held in proper relationship with reference to the oscillating plate 14 by means of the bolt 16. In the accompanying drawings the bolt 16 is shown square and in order to provide for the adjustment of the primary lever 15 with reference to the oscillating plate the aperture formed in the lever 15, and through which aperture the bolt 16 passes, should be formed round so that the lever 15 can have a pivotal movement upon the bolt when said lever is adjusted with reference to the oscillating plate as hereinafter described.

The primary lever 15 is operated by the foot of the driver and in order to adjust this lever so as to bring it into proper position with the oscillating plate 14, said lever is adjustable independent of said plate. In order to provide for this independent adjustment the oscillating plate 14 is provided with the curved slot 17, through which curved slot and through the lever 15 is passed the clamping bolt 18.

For the purpose of preventing any slipping movement or lost motion as between the lever 15 and the oscillating plate 14 except at such times as it is necessary to adjust the lever with reference to the plate said plate is provided with the serrated flange 19 upon which serrated flange is seated the serrated face 20 formed upon the lever 15. It will be understood that when the nut upon the clamping bolt 18 is tightened the lever 15 will be held against independent movement in reference to the oscillating plate 14. Upon the bolt 16 is located the serrated faced collar 21 against the serrated face of said collar is located the secondary lever 22, which lever is held against the serrated faced collar 21 by means of the bolt 16 and its clamping nut 23, said lever 22 being for the purpose of actuating the oscillating plate 14, and lifting the plow as hereinafter described. To the oscillating plate 14 is connected the short arm 24 by means of suitable clamp bolts 25, and for the purpose of providing adjustment for the short arm 24 said arm is provided with the elongated slot 26, and for the purpose of securely holding the short arm 24 against end movement it is provided with the serrated face 27 which serrated face fits against the serrated flange 28. To the short arm 24 is pivotally connected one end of the link 29 and the opposite end of said link pivotally attached to the downward extending arm 30, which downward extending arm is provided with the serrated face 31, which serrated face is seated against the serrated nut 32 which nut is held against rotation by being seated in the channel or groove 33 formed in the side of the plow beam 1, so that there will be no swinging or oscillating movement of the arm 30. In order to prevent the nut 32 from rotating it is provided with the straight faced flange portion 35, which straight faced flange portion is seated in the groove formed in the plow beam.

In Fig. 1 the mold board 36 together with the parts belonging to the said mold board and the plow beam are shown in elevated position, but when it is desired to bring the mold board into the position illustrated in dotted lines Fig. 1 the primary lever 15 is moved into the position illustrated in dotted lines, Fig. 1, but before the lever 15 can be moved forward it is necessary to release the dog 37 from engagement with the stop 38 which stop is connected to the plate 12 and adjustably attached by means of the curved slot 39 and the clamping bolt 40, and for the purpose of preventing any accidental displacement of the stop 38 a portion of the face of the plate 12 and one face of the stop 38 is serrated, and the serrated faces seated against each other.

When it is desired to lower the mold board the short trip lever 41 is pushed in the direction indicated by the arrow Fig. 2, which movement lifts the dog 37 by means of the rod 42, owing to the fact that the lower end of the trip lever 41 is moved upward. After the trip lever 41 has been moved to release the dog 37 the lever 15 is rocked or thrown forward into the position shown in dotted lines Fig. 1, which movement rocks the oscillating plate 14 and brings the short arm 24 and the link 29 into the position illustrated in Fig. 3, throwing said parts at an angle to a horizontal line, thereby locking the parts in a lowered position. For the purpose of limiting the forward movement of the lever 15, the oscillating plate 14 is provided with the outward extending flange or lug 43, which lug or flange strikes the top of the set screw 44, which set screw is held in proper adjustment by means of the flange 45, which flange is preferably formed integral with the fixed plate 12 and is provided with a screw threaded aperture through which the set screw 44 is passed.

It will be understood that when the primary lever is thrown forward as illustrated in dotted lines Fig. 1, and full lines Fig. 3 the secondary lever 22 is brought into an elevated position, or in the position best illustrated in Fig. 3 and when it is desired to elevate the plow beam and the different parts carried thereby, said secondary lever 22 is pressed downward moving the oscillating plate 14 in the opposite direction from that imparted to it by the forward movement of the primary lever 15, thereby lifting the plow beam and the mold board.

To the plow beam 1 is attached the bracket 46 and to one of the frame bars 6 is attached the bracket 47 which bracket carries the screw threaded hooked bar 48 upon which screw threaded bar is located the nut 49 which nut is for the purpose of holding the hooked bar 48 against end movement in one direction. To the hooked bar 48 and to the bracket 46 is attached the spring 50. After the lever 15 is moved forward the plow beam 1 is moved forward thereby bringing the spring 50 into tension, the tension being stored after the lever has been thrown from a vertical position forward or practically stored during this time. It will be understood that when the lever has been thrown forward and the beam locked in a lowered position by throwing the link 29 past or below the center or what might be termed more specifically speaking, the pivotal point of the oscillating plate 14, the tension of the spring assists in elevating the plow when the lever 22 is brought down.

For the purpose of holding the trip lever 41 in position to hold the dog 37 in engagement with the stop 38 the spring 51 is provided. For the purpose of providing a good foot hold to throw the lever 15 forward the thimbles 52 and 53 are provided which thimbles are held in proper relative position with reference to the lever 15 by means of the rivet 54.

For the purpose of giving tension to the spring 51 and holding the trip lever 41 in its normal position one end of the spring is secured to the bottom or lower end of the trip lever 41 and the opposite end connected to the lever 15.

For the purpose of clamping the bracket 46 the nut 32 and the arm 30 in proper relationship with reference to the plow beam 1, the clamping bolt 34 is provided. The lever 22 is provided with the lateral arm 55 or its equivalent, which is for the purpose of providing a means of operating said lever by the foot, this lateral arm is best illustrated in Fig. 6.

For the purpose of allowing the oscillating plate 14 to be located in close relationship with reference to the fixed plate 12, said oscillating plate is provided with the recessed flange 56, which recessed flange provides room for the bolt heads, which bolts are adapted to connect the short arm 24 to the oscillating plate.

Having fully described my invention, what I claim as new and desire to secure by Letters Patent, is—

1. In a foot lift for wheeled plows, a frame mounted upon traveling wheels, a plow beam supported upon swinging bars, a fixed plate secured to the frame, an oscillating plate carried by the fixed plate, said oscillating plate provided with an adjustable arm, a link pivoted to said arm at one end, a fixed arm secured to the plow beam and the opposite end of the link pivotally attached to said fixed arm, levers adapted to actuate the oscillating plate, one of said levers provided with a trip lever, and a dog, and means for actuating the dog by the trip lever, and a stop flange located upon the fixed plate, substantially as and for the purpose specified.

2. In a foot lift for wheeled plows, a frame mounted upon traveling wheels, a beam supported upon rock bails, a fixed plate and an oscillating plate carried by said fixed plate, a bolt located through the oscillating plate and fixed plate, a lever loosely mounted upon the bolt, and said lever adjustably attached to the oscillating plate, and means for lifting the plow beam, said means adapted to be actuated by the oscillating plate, substantially as and for the purpose specified.

3. In a foot lift for wheeled plows, a frame mounted upon traveling wheels, a beam supported upon rock bails, a fixed plate and an oscillating plate carried by said fixed plate, a bolt located through the oscillating plate and fixed plate, a lever loosely mounted upon the bolt and said lever adjustably attached to the oscillating plate, means for lifting the plow beam, said means adapted to be actuated by the oscillating plate, and means for limiting the oscillating movement of the plate, substantially as and for the purpose specified.

4. In a foot lift for wheeled plows, a frame mounted upon traveling wheels, a beam carried by said frame and supported upon rock bails, a fixed plate secured to the frame, an oscillating plate carried by the fixed plate, a primary and a secondary lever mounted concentrically with the oscillating plate, said levers adjustably connected independent of the oscillating plate, an arm adjustably attached to the oscillating plate and a link pivoted to said arm, a fixed arm carried by the plow beam, said fixed arm having pivotally attached thereto one end of the link pivoted to the arm carried by the oscillating plate, and means for limiting the movement of the oscillating plate, substantially as and for the purpose specified.

5. In a foot lift for wheeled plows, the combination of a traveling frame, a plow beam supported upon rock bails, a fixed plate provided with adjustable stops, an oscillating plate, levers mounted at the pivotal points of the oscillating plate, one of said levers provided with a spring actuated trip lever, a rod connected to said trip lever, a dog adapted to engage one of the stops on the fixed plate, and means for lifting the plow beam intermediate the oscillating member and the plow beam, substantially as and for the purpose specified.

6. In a foot lift for wheeled plows, the combination of a frame, a plow beam supported upon swinging bails, a plate secured to the frame intermediate the swinging bails, an oscillating plate carried by the fixed plate and levers adapted to actuate the oscillating plate, means for imparting oscillating movement to the oscillating plate, means intermediate the plow beam of the oscillating plate adapted to lift the plow beam, and means for holding the levers in fixed adjustment with reference to the oscillating plate, substantially as and for the purpose specified.

In testimony that I claim the above, I have hereunto subscribed my name in the presence of two witnesses.

MORRIS GOULD.

Witnesses:
F. W. BOND,
NILES A. SPONSELLER.